United States Patent [19]
Ishimatsu et al.

[11] 3,915,797
[45] Oct. 28, 1975

[54] IMMOBILIZED ENZYMES

[75] Inventors: Yoshiaki Ishimatsu; Shigeki Shigesada; Shoji Kimura, all of Machida, Japan

[73] Assignee: Denki Kaguku Kogyo Kabushiki Kaisha, Tokyo, Japan

[22] Filed: Feb. 20, 1974

[21] Appl. No.: 444,018

[30] Foreign Application Priority Data
May 30, 1973  Japan.............................. 48-60679

[52] U.S. Cl.............. 195/29; 195/31 R; 195/31 F; 195/63; 195/68; 195/DIG. 11; 195/116
[51] Int. Cl.².................... C07G 7/02; C12D 13/00
[58] Field of Search .......... 195/63, 68, DIG. 11, 29, 195/31, 31 F, 116; 260/2.1 R, 2.1 M, 2.1 E, 2.2 R

[56] References Cited
UNITED STATES PATENTS
3,563,921   2/1971   Bourat.......................... 260/2.1 E X OTHER PUBLICATIONS
Zaborsky, O., Immobilized Enzymes, The Chemical Rubber Co., 5/1/73, (pp. 75–82).

Primary Examiner—David M. Naff
Attorney, Agent, or Firm—Stevens, Davis, Miller & Mosher

[57] ABSTRACT

A water-insoluble enzymatically active composition is produced by causing a biologically active enzyme or enzymatically active microorganic cells to be adsorbed on an anion-exchange-resin having a quaternary pyridine ring in the molecular unit thereof. A method for the preparation of this composition and a method for the use thereof are also disclosed.

14 Claims, No Drawings

IMMOBILIZED ENZYMES

BACKGROUND OF THE INVENTION

1. Field of the Invention:

This invention relates to an enzymatically active composition having an enzyme and microorganic cells immobilized by chemically bonding to an insoluble matrix and to a continuous enzyme reaction process utilizing the immobilized enzymatically active composition.

2. Description of the Prior Art:

Various activities of different enzymes and uses issuing therefrom have extensively been established to date. These enzymes are proteins by nature and therefore are soluble in water. It follows naturally that most of these enzymes are dissolved out and wasted in the course of use.

There are many uses in which microorganic cells lacking a glowing function but possessing an enzymatic activity (so-called resting microorganic cells) are applied to various enzyme reactions. In this case, although the cells themselves are insoluble, the active enzymes contained therein are dissolved out and wasted in the course of use. In order that such enzymes and microorganic cells may retain their biological activities for a long time, many attempts have been being made in recent years to have them immobilized on water-insoluble carrier substances to elongate their enzymatic activities.

The techniques so far suggested still suffer from various disadvantages from the standpoint of commercial applications as follows:

1. Carriers which are indispensably used in conjunction with enzymes for the preparation of insolubilized enzymes are expensive.
2. Processes employed for the reaction between carriers and enzymes to produce said compositions are complicated.
3. Enzymatic activities exhibited by insolubilized enzymes are pronouncedly low compared with the activities possessed by the same enzymes in their original form prior to insolubilization.
4. Substrate specificities exhibited by insolubilized enzymes sometimes differ from those possessed by the same enzymes in their original form prior to insolubilization. Decline of such specificities is particularly conspicuous with respect to high molecular weight substrates.
5. No carrier is universally available for insolubilization of a rich variety of enzymes.

Under the circumstances, there has been a long-cherished desire for the appearance of a universal method for the production of inexpensive highly active immobilized enzyme substances.

With a view to overcoming the various disadvantages described above and developing a novel, commercially advantageous method for the production of immobilized enzyme compositions, various polymers possessed of different functional groups were synthesized and ways studied to bond various enzymes on these polymers.

Consequently it was discovered that vinylpyridine modified copolymers are most suited for combination with enzymes. The present invention is accomplished on the basis of this discovery.

SUMMARY OF THE INVENTION

This invention relates to novel, commercially useful immobilized enzyme compositions, a method for the manufacture thereof, and a method for the use thereof. The term "immobilized enzyme compositions" as used in this invention refers to the compositions produced by bonding enzymes and microorganic cells to carriers which are obtained by copolymerizing vinylpyridine or derivatives thereof with one or more monomers selected from among copolymerizable aromatic vinyl compounds, ethylenically unsaturated compounds and diene-unsaturated compounds to thereby giving rise to copolymers and quaternizing the nitrogen atom of the pyridine ring thereof.

According to this method, a host of enzymes and microorganic cells can be immobilized on such carriers without affecting their biological activities. Use of the produced compositions permits various enzyme reactions to be carried out in a continuous reaction system which has not been possible with conventional water-soluble enzymes. Thus, this invention has a profound industrial significance.

Particularly, since the carriers of the present invention can be produced with desired behaviors and in desired shapes by properly controlling the production conditions, this invention is characterized in that the carriers can be prepared in conformity with the designs of enzyme reaction vessels adapted to the kinds of enzymes and microorganic cells desired to be immobilized and to their respective characteristic enzyme reactions and the immobilized enzyme compositions are produced by using these carriers.

GENERAL DESCRIPTION OF THE INVENTION

This invention comprises the following four steps of process.

1. Preparation of copolymers having vinylpyridine or derivatives thereof substantially bonded within molecules thereof.
2. Preparation of water-insoluble anion-exchangeable matrixes by quaternization of the pyridine rings of said copolymers.
3. Preparation of immobilized enzyme compositions by combination of said matrixes with enzymes and microorganic cells.
4. Continuous conversion of substrates by catalysis with said immobilized enzyme compositions.

The individual steps of the process described above will be explained in further detail below.

1. Preparation of copolymer:

The term "copolymers" is used herein to mean copolymers which are obtained by copolymerizing vinylpyridine or derivatives thereof with one or more other monomers or polymers by suitable methods of polymerization.

Vinylpyridine and derivatives thereof include 2-vinylpyridine, 4-vinylpyridine, 2-methyl-5-vinylpyridine, 5-methyl-2-vinylpyridine, 3-allylpyridine and their related compounds such as 1-vinylquinoline. In consideration of cost and copolymerizability with other monomers, however, it is most desirable to use 4-vinylpyridine, 2-vinylpyridine and 2-methyl-5-vinylpyridine. Other monomers which are copolymerizable with vinylpyridine and derivatives thereof include aromatic vinyl compounds such as styrene, α-methylstyrene and halogenated styrenes, ethylenically unsaturated compounds such as ethylene, propylene, acrylic acid, methacrylic acid, methyl methacrylate, acrolein, vinylacetate, acrylonitrile, vinyl chloride, acrylamide and N-methyrol-acrylamide, diene compounds such as butadiene, isoprene and chloroprene, and divinyl compounds such as divinylbenzene, ehtylene glycol dimethacrylate, polyethylene glycol dimethacrylate, butane diolacrylate, diallyl phthalate and methylene bisacrylamide.

Polymers which are copolymerizable with vinylpyridine and therefore are usable herein include polybutadiene, polyisoprene, polychloroprene, styrene-butadiene copolymer, chlorinated polyethylene, polypropylene, polyvinyl alcohol, etc.

The preparation of copolymers of the present invention can be effected by adopting any of the known methods of copolymerization. For the preparation of copolymers of this invention, the most important thing is that the method of copolymerization to be adapted and the kind of monomer to be used in this step should be selected in such a manner that the matrixes to be produced in the subsequent step through the quaternization of these copolymers should be hydrophilic and at the same time insoluble in all solvents, particularly in water.

Form such point of view, methods employed for the preparation of copolymers of this invention may broadly be divided under the following two classes.

1. Random copolymerization

When the technique of radical copolymerization such as, for example, suspension polymerization and emulsion polymerization are used for the purpose of copolymerization, there are obtained copolymers in which vinylpyridine and other monomers are randomly arranged. Although these copolymers are insoluble in water, they are rendered soluble in water when they undergo quaternization in the subsequent step for polymer modification. By this reason, vinylpyridine and divinyl compounds should be used as essential components where the copolymerization is effected by such techniques. In this case, desirable divinyl compounds are divinylbenzene and (poly)ethylene glycol dimethacrylate.

The compositions and molecular weights of monomers which go to make up these copolymers are not critical but may be selected freely so as to meet the purposes of finally produced matrixes. For practical purposes, the amount of vinylpyridine or derivatives thereof incorporated in the copolymers is desirable in the range of from 20 to 99 mol%, preferably from 50 to 95 mol% and that of divinyl compounds in the range of from 0.5 to 30 mol%, preferably from 1 to 20 mol% respectively.

For example, when the amount of vinylpyridine incorporated does not exceed 20 mol% and that of divinyl compound exceeds 30 mol%, the produced matrixes have lower hydrophilicity and anion-exchange capacity and the amount of enzymes and microorganic cells combined therewith is proportionately decreased, making it impossible to produce immobilized enzyme compositions if high efficiency.

When, on the other hand, the amount of vinylpyridine incorporated exceeds 90 mol% and that of divinyl compounds combined therewith does not exceed 0.5 mol%, the produced matrixes are partially dissolved in water and consequently become unstable.

Preferred examples of the copolymers obtainable by the techniques of random copolymerization, therefore, are vinylpyridine-styrene-divinylbenzene copolymer, vinylpyridine-methyl methacrylate-divinylbenzene copolymer and vinylpyridine-ethylene glycol dimethacrylate copolymer.

2. Block and graft copolymerization

When the techniques of block copolymerization and graft copolymerization are used for the purpose of copolymerization, there are obtained copolymers in which vinylpyridine and other monomers or polymers are arranged in the form of blocks. If such other monomers or polymers are hydrophobic, then when the copolymers are quaternized in the subsequent step of polymer modification to have the hydrophilicity of vinylpyridine moiety enhanced, the copolymers as a whole are hydrophilic but substantially insoluble in water because the polymer portions formed of other monomers still retain hydrophobicity. In this case, therefore, it is not particularly necessary to use such crosslinking reagents as divinyl compounds. In the case of block copolymerization, the most desirable monomers for copolymerization with vinylpyridine are styrene and methyl methacrylate. In the case of graft copolymerization, desirable base polymers are styrene-butadiene copolymer, chlorinated polyethylene and the like. The compositions and molecular weights of copolymer which go to make up the copolymers can freely be selected so as to suit the purposes for which the final products (matrixes) are used. For practical purposes, the amount of vinylpyridine or derivatives thereof to be incorporated in the copolymers is desirable in the range of from 25 to 75 mol%, preferably from 40 to 60 mol%.

When the amount of vinylpyridine incorporated does not exceed 25 mol%, the matrixes have insufficient hydrophilicity and anion-exchange capacity and the amount of enzyme and microorganic cells to be combined is proportionately reduced, making the matrixes unsuitable for the intended applications. The amount exceeding 75 mol% is also undesirable, because the produced matrixes are unstable to water.

Concrete examples of preferable copolymers which are produced by the techniques of block and graft copolymerization are vinylpyridine-styrene block copolymer, vinylpyridine-methyl methacrylate block copolymer and vinylpyridine-chlorinated polyethylene graft copolymer.

Which technique should be selected from the above ones is depended upon the types of matrixes desired to be produced.

Where a matrix of an amorphous powdery form is desired, a copolymer produced by radical emulsion copolymerization or ionic block copolymerization will suffice for the purpose. Where a matrix in the form of porous beads is required, a copolymer produced by radical suspension copolymerization will meet the purpose. Where a matrix in the form of a film is desired, it can be prepared by first producing a copolymer by ionic block copolymerization or graft copolymerization and subsequently fabricating the resultant copolymer into a film by means of casting process.

Thus, methods for the preparation of copolymers can be selected so as to suit the final forms which are to be assumed by immobilized enzyme compositions.

2. Preparation of carrier:

The term "carriers" is used herein to mean water-insoluble anion-exchangers obtained by quaternarizing the pyridine ring of copolymers prepared as described in (1) above.

The quaternization of the nitrogen atom of the pyridine ring is effected most advantageously by utilizing the quaternization reaction of an amine compound by a halogenating agent, particularly by a halogenated alkyl reagent. Desirable halogenated alkyls are methyl chloride, methyl bromide, propyl bromide, methyl iodide, etc.

Besides these, sulfur compounds such as sulfur dioxide, sulfur trioxide, thionyl chloride and dimethyl sulfate, carbonyl compounds such as benzyl chloride, acid chlorides and acid anhydrides, metal halide compounds such as aluminum trichloride, copper chloride and cobalt chloride, and acidic high molecular compounds such as long-chain alkyl sulfonates, polystyrene sulfonate and polyacrylic acid are also usable for this purpose.

In practiciing the present invention, use of alkyl halogenides and alkyl sulfates is particularly desirable in terms of the efficiency of quaternization process. The conditions of the quaternization are invariably very easy to observe, although they are variable with the particular kinds of quaternizing agents to be used. When a halogenated alkyl is used, for example, the pyridine ring can be quaternized substantially quantitatively by placing a dry polymer and the halogenated alkyl in a pressure-resistant vessel and heating the reactants at a temperature of from 70° to 130°C for 4 to 5 hours.

As to anion-exchange-resins, the carriers to be obtained by the method of this invention have a total anion-exchange capacity of the order of 1.5 to 5.0 meq/g. Particularly, those which have a capacity of the order of 2.5 to 4.5 meq/g are desirable.

3. Preparation of immobilized enzyme composition:

Typical enzymes and microorganic cells which are usable for the preparation of immobilized enzyme compositions according to this invention include bacterial protease, aminoacylase, adenosine deaminase, AMP deaminase, amidase, $\alpha$-amylase, $\beta$-amylase, glucoamylase, lacticdehydrogenase, trypsin, papain, ribonuclease, dextranase, glucose oxidase, penicillinacylase, chymotrypsin, ficin, pepsin, carboxypectidase, streptkinase, urease, invertase, maltase, lactase, lipase, cellulase, catalase, melibiase, tryosinase, aspartase, glucoseisomerase, phenoloxidase and racemase and microorganic cells which retain the activities of such enzymes. The binding of the various enzymes and corresponding microorganic cells described above with the aforementioned carriers can quite easily be effected by bringing the carriers into aqueous solutions of enzymes or aqueous suspensions of microorganic cells of any desired concentration in pH ranges in which the selected enzymes and microorganic cells can remain stable. The contact gives birth to immobilized enzyme compositions aimed at by the present invention. This reaction of binding is completed in a short period of time.

The temperature of the binding reaction can be selected within a wide range, so far as it is below the level beyond which the enzymes have their activities impaired. Desirably the temperature is in the range of from 5° to 20°C.

As described above, the binding of carriers and enzymes or microorganic cells for the production of immobilized enzyme compositions is accomplished by a very simple process under mild conditions as compared with those of the conventional methods. Thus, this process offers great industrial advantages.

In the binding reaction between the carrier and the enzyme, incorporation in the reaction system of a substance which will afterwards serve as a substrate for the enzyme reaction and a metal ion which will serve to accelerate said enzyme reaction will effectively prevent the resultant immobilized enzymatically active substances from being degraded in enzymatic activity.

As occasion demands, the immobilized enzyme compositions produced as described above may be washed with buffer solutions appropriate for the incorporated enzymes or with refined water so as not to completely free the enzyme and thereafter treated by a lyophilization process so as to be preserved in a completely dry state for a long time.

When the biological activities of these immobilized enzyme compositions were determined by following, with necessary modifications, the method adopted in determining the activities of the original enzymes prior to incorporation in the compositions and the life of such activities were evaluated by analyzing the continuous enzyme reaction by use of a packed column system, it was found that the compositions retained the biological activities for a long time. Thus, this invention has been proved to be excellent.

The carriers obtained by the method of this invention enjoy many advantages: For example, they provide high ion-exchange capacity, they show high hydrophilicity in spite of their insolubility in water and other solvents, they permit bonding of a large amount of enzyme and microorganic cells, they produce no adverse effect on the incorporated enzymes (because of neutrality of the base polymer of the carrier) and the enzymes incorporated in the compositions retain the same enzymatic activities as those of the corresponding original enzymes prior to incorporation.

Another important characteristic is the fact that the enzyme and the carrier are bonded with the strength not of mere ionic adsorption but of covalent bonding, so that the enzyme is not easily released from the carrier. It has been confirmed that all these advantages issue from the very fact that this invention relies upon copolymers using vinylpyridine or derivatives thereof as the principal component. Such combination has never been realized to date. For the first time, the present invention has made it possible to produce immobilized enzyme compositions of outstanding properties.

4. Continuous conversion of substrate through catalysis by immobilized enzyme composition:

Enzymes and enzymatically active microorganic cells are highly useful and, therefore, have found extensive utility for industrial applications. However, because the enzymes are readily soluble in water, the enzyme reactions are inevitably required to be carried out batchwise. The enzymes once used in reactions remain dissolved in reaction mixtures and, therefore, cannot be recovered for cyclic use. In the case of an enzyme reaction system in which the reaction product gives an obstruction to the reaction, the reaction is prevented from proceeding beyond a certain level.

As described above, a number of difficulties stand to confront the conventional ways of enzyme utility. Due to the circumstances, techniques for insolubilization of enzymes and immobilization of microorganic cells have been awaited as effective measures for the solution of these difficulties.

To be specific, insolubilization of enzymes and immobilization of microorganic cells permit the resulting preparations to be used cyclically for a long time and the enzyme reactions to be performed in a continuous operation. Thus industries utilizing enzymes can be streamlined operation-wise and greatly improved in terms of economy.

Since the carriers of the present invention are prepared by a process of purely chemical synthesis, they can be obtained in any of a rich variety of forms by properly selecting the method of polymerization, conditions of polymerization and compositions of monomers. Accordingly, immobilized enzyme compositions may be obtained in any forms suited to the various reaction vessels employed suitably.

Of the various possible reaction vessels, particularly effective is the packed bed column. In the case of this particular reaction vessel, the desired enzyme reaction can easily be carried out continuously and substantially automatically for a long time by merely packing the column with the immobilized enzyme composition produced in the form of beads or powder to a fixed capacity and feeding it with a given substrate at a fixed feed rate.

To practice the present invention, the column is packed with the immobilized enzyme composition in conjunction with an inactive diluent. This incorporation of the diluent serves the purpose of preventing the column from possible clogging or channeling and consequently maintaining the reaction system in a stable form.

Examples of useful diluents for this purpose include wood powder, glass beads, cellulose powder, plastic beads, diatomaceous earth, cerite and other inorganic substances. Any similar substance can be used so far as it is inactive.

Production Examples 1 through 9 will be cited herein below to illustrate the preparation of carriers for use in the present invention.

Production Example 1:

Preparation of quaternized (2-vinylpyridinestyrene) block polymer

A reactor having a volume of 1.5 liters and completely displaced with dry $N_2$ was charged with 800 cc of purified tetrahydrofuran and 55.2 cc (0.48 mol) of purified styrene (hereinafter referred to as "St.") and cooled externally until the contents fell to a temperature −20°C. Then, 2.0 m.mol of n-butyl lithium was added to the contents to initiate polymerization. In about 30 minutes thereafter, 50.4 cc (0.48 mol) of purified 2-vinylpyridine (hereinafter referred to as 2–VP) was added and the reaction was allowed to continue for the next 30 minutes. Thereafter, a small amount of n-propanol was added to stop the polymerization and the reaction mixture was introduced in a large volume of water to separate the formed polymer. The polymer was then dried. The conversion was 100%. Analysis of the copolymer by IR, NMR, etc. revealed that 2–VP and St. were bonded substantially equimolarly in a pattern proper to block copolymerization. A glass column having an inside diameter of 3 cm was packed in a layered pattern with 20 g of the powdery (60 – 100 mesh) 2-VP-St. block copolymer and methyl bromide in a vapor form was blown in at a feed rate of 100 cc/min. for about two hours. The quaternized block copolymer thus obtained was found to reflect a weight increase of 7 g, indicating that the corresponding amount of methyl bromide had been combined. This copolymer remained undissolved in tetrahydrofuran, methanol and water. It was found to have an anion-exchange capacity of about 3.5 meq/g. This anion-exchange capacity was determined by the silver nitrate-titration method.

Production Example 2:

A quaternized block polymer was obtained by repeating the procedure of Production Example 1, except 0.72 mol of 2–VP and 0.24 mol of St. were used. The resultant copolymer was found to have an anion-exchange capacity of 4.6 meq/g.

Production Example 3:

A quaternized block polymer was obtained by repeating the procedure of Production Example 1, except 0.24 mol of 2–VP and 0.72 mol of St. were used. The resultant copolymer was found to have an anion-exchange capacity of 2.5 meq/g.

Production Example 4:

Preparation of quaternized (2-vinylpyridinestyrene-divinyl benzene) random polymer A reactor having a volume of 2 liters and displaced with dry $N_2$ was charged first with 1000 g of water and 10 g of polyvinyl alcohol as a suspension stabilizer and then with 250 g of 2–VP and 250 g of styrene as monomers and 10 g of divinylbenzene (hereinafter referred to as DVBz). The reactor contents were maintained at a temperature 70°C while under agitation. Then, 2 g of benzol peroxide was added to initiate polymerization. In about 20 hours of reaction, a copolymer which crystallized out in the form of beads was separated by filtration, washed thoroughly with methanol and water and dried. The conversion was found to be 95%. Elementary analysis showed that this copolymer contained St. and 2–VP equimolarly and had a cross-linked structure. In an autoclave having a volume of 500 cc and made of stainless steel, 100 g of the (2-VP-St.-DVBz) random copolymer in the form of beads (10 – 100 mesh) and 100 g of methyl bromide were placed and allowed to react at 80°C for 5 hours. At the end of the reaction, the autoclave contents were deprived of unaltered methyl bromide and the reaction product was dried. The quaternized polymer thus obtained reflected a weight increase of 40 g, indicating that the corresponding amount of methyl bromide had been incorporated. This polymer was found to be insoluble in all solvents and to have an anion-exchange capacity of 3.6 meq/g.

Production Example 5:

Similar results were obtained by repeating the procedure of Production Example 4, except 375 g of 2–VP and 125 g of St. were used. The resultant copolymer was found to have an anion-exchange capacity of 4.5 meq/g.

Production Example 6:

Similar results were obtained by repeating the procedure of production Example 4, except 375 g of 4-vinylpyridine (hereinafter referred to as 4–VP) was used in place of 2–VP and 125 g of methyl methacrylate (hereinafter referred to as MMA) was placed in place of St.

The resultant copolymer was found to have an anion-exchange capacity of 4.3 meq/g.

Production Example 7:

Similar results were obtained by repeating the procedure of Production Example 4, except 20 g of ethylene glycol dimethyacrylate (hereinafter referred to as EDMA) was used in place of DVBz. The resultant copolymer was found to have an anion-exchange capacity of 3.5 meq/g.

Production Example 8:

A reactor having a volume of 2 liters and displaced with dry $N_2$ was charged first with 1000 g of pure water and 30 g of sodium fatty acid soap as an emulsifier and then with 250 g of 4–VP, 250 g of St. and 10 g of DVBz and further with 1.5 g of t-dodecyl mercaptan as a molecular weight modifier. The reactor contents were maintained at a temperature 50°C while under agitation. Then 1.5 g of potassium persulfate was added as a catalyst to initiate polymerization. In about 20 hours of polymerization, the produced polymer was precipitated in the reaction mixture by the addition of 2 liters of acetone. The precipitated polymer was separated through filtration, washed thoroughly with pure water and dried. The conversion was found to be 90%. Elementary analysis showed that this copolymer contained St. and 4–VP equimolarly and had a crosslinked structure. Then, 100 g of the powdery (100 – 200 mesh) polymer prepared as described above was quaternized with methyl bromide by following the procedure of Production Example 4. The resultant polymer was found to be insoluble in all solvents and to have an anion-exchange capacity of 3.4 meq/g.

Production Example 9:

Similar results were obtained by following the procedure of Production Example 8, except 375 g of 2–VP was used in place of 4–VP and 125 g of MMA was used in place of St. The resultant polymer was found to have an anion-exchange capacity of 4.5 meq/g.

phate buffer solution with pH 8.0, and the resultant bufferized polymer was filtered out to serve as a wet carrier. Then, this wet carrier was added to be suspended in a solution prepared by dissolving 1 g of a commercially available aminoacylase (activity units: 10,000 u/g) of a species of genus Aspergillus in 100 cc of 0.1M phosphate buffer solution with pH 8.0. The suspension was agitated at 4°C for 2 hours. Thereafter, the suspension was centrifuged and the resultant sediment was washed several times with 0.1M phosphate buffer solution with pH 8.0. The sediment thus obtained was finally lyophilized. The yield was 2.3 g. The supernatant which occurred in the reaction described above was analyzed for protein concentration by Lowry process (J. Biol. Chem., 193, 26 (1951)), to show that absolutely no protein was present therein. This clearly indicates that the whole amount of aminoacylase used had been bonded to the carrier. Thereafter, the immobilized aminoacylase composition thus obtained was tested for enzyme activity by the following method: A mixture consisting of 10 mg of test specimen, 1 cc of pure water, 2 cc of 0.1M phosphate buffer with pH 8.0 and 1 cc of 0.1M n-acetyl-DL-methionine (pH 8.0, containing $5.0 \times 10^{-4}M$ $Co^{++}$) was held at 37°C for 30 minutes by way of incubation. The liberated methionine was assayed by the ninhydrin colorimetric method. Activity units were indicated by assuming the unity, 1 unit/g, to represent production of 1 $\mu$.mol of methionine from 1 g of a given specimen under a fixed set of conditions. The immobilized aminoacylase composition obtained in this example was found to have abouot 1500 units/g of activity.

EXAMPLES 2 – 5:

Table 1 shows different immobilized aminoacylase compositions prepared by using various carriers which had been produced in the indicated carrier production examples. The conditions for immobilization and the method for the determination of enzyme activity which were described in Example 1 apply here with necessary modifications.

Table 1

| Example No. | Production Example No. (carrier) | Composition of starting polymer | Yield of immobilized product (g) | Ratio of aminoacylase bonded (%) (*1) | Enzyme activity units (u/g) (*2) |
| --- | --- | --- | --- | --- | --- |
| 2 | 2 | 2-VP-St. block copolymer | 3.0 | 100 | 2500 |
| 3 | 4 | 2-VP-St.-DVBz copolymer | 2.0 | 100 | 800 |
| 4 | 5 | 2-VP-St.-DVBz copolymer | 2.5 | 95 | 1700 |
| 5 | 6 | 4-VP-MMA-DVBz copolymer | 2.7 | 100 | 2100 |

(*1) The values in this column were found by testing the supernatants of respective reaction mixtures for protein concentration by Lowry process.
(*2) The values in this column were found by carrying out the determination using N-acetyl-DL-methionine as a substrate.

Production of immobilized enzyme compositions according to the present invention will be described with reference to preferred embodiments herein below.

EXAMPLE 1:

Preparation of immobilized aminoacylase composition

The quantity 2 g of the quaternized block polymer (60 – 100 mesh) prepared in Production Example 1 was kept immersed overnight in 100 cc of 0.1M phos-

EXAMPLES 6 – 11:

Preparation of immobilized glucoamylase compositions

Table 2 shows preferred embodiments of the immobilization of a commercially available glucoamylase (activity units – 5000 u/g) from species of genus Rhizopus on various carriers produced in the indicated carrier production examples.

Table 2

| Ex. No. | Production Example No. (carrier) | Carrier Composition of starting polymer | Amount used | Gluco-amylase | Conditions for immobilization | Yield of immobilized product (g) | Ratio of glucoamylase bonded (%) (*1) | Enzyme activity units(g/g) (*2) |
|---|---|---|---|---|---|---|---|---|
| 6 | 1 | 2-VP-st. block copolymer | Each carrier 2g was bufferized with 0.1M acetate buffer solution (ph 4.5) and converted into a wet carrier | Glycoamylase 2g, was dissolved in 100 cc of 0.1M acetate buffer solution (ph 4.5) | Each wet carrier was added to gluco-amylase solution and agitated at 4°C for 2 hours to permit reaction to ensue. After reaction, the reaction mixture was centrifuged and the sediment was washed several times with 0.1M acetate buffer solution (ph 4.5) and thereafter lyophilized. | 2.3 | 50 | 400 |
| 7 | 2 | 2-VP-St. block copolymer | | | | 2.6 | 70 | 500 |
| 8 | 5 | 2-VP-St.-DVBz copolymer | | | | 2.5 | 65 | 430 |
| 9 | 6 | 4-VP-MMA-DVBz copolymer | | | | 2.5 | 68 | 450 |
| 10 | 7 | 2-VP-St.-EDMA copolymer | | | | 2.4 | 65 | 400 |
| 11 | 8 | 4-VP-St. DVBz copolymer | | | | 2.0 | 53 | 280 |

(*1) The values of the ratio of glucoamylase bonded were found by testing the supernatants of the respective reaction mixtures for protein concentration by Lowry process.

(*2) The enzyme activity was determined by the following method: A mixture of 10 mg of a given specimen, 1 cc of pure water and 9 cc of 0.56% soluble starch solution (in 0.1M acetate buffer with pH 4.5) was held at 40°C for 30 minutes to effect incubation. The resultant mixture was tested for reducing sugar by DNS method. Activity units were indicated by assuming the unity, 1 unit/g, to represent production of 10 mg of reducing sugar from 1 g of a given specimen under a fixed set of conditions.

EXAMPLES 12 – 15:

Preparation of immobilized glucose isomerase compositions

Table 3 shows preferred embodiments of the immobilization of commercially available microorganic cells possessed of glucose isomerase activity (activity - 1000 GIU) from a species of genus Streptomyces on various carriers produced in the indicated carrier production examples.

Table 3

| Ex. No. | Production Example No. (carrier) | Carrier Composition of starting polymer | Amount used | Gluco-amylase | Conditions for immobilization | Yield of immobilized product (g) | Ratio of enzyme and cells bonded (%) (*1) | Enzyme activity units (GIU) (*2) |
|---|---|---|---|---|---|---|---|---|
| 12 | 4 | 2-VP-St.-DVBz copolymer (60 – 100 mesh) | Each carrier, 0.5 g, was bufferized with 0.1M phosphate buffer solution with ph 8.0 and converted into a wet carrier. | Cells, 2.0 g (solids 0.8 g) were suspended in 100 cc of water. | Each wet carrier was added to the suspended solution of cells and agitated at 4°C for 2 hours to permit reaction to ensue. After reaction, the reaction mixture was centrifuged and the sediment was washed several times with water and thereafter lyophilized. | 1.1 | 100 | 700 |
| 13 | 6 | 4-VP-MMA-DVBz copolymer (100 – 200 mesh) | | | | 1.2 | 100 | 800 |
| 14 | 8 | 4-VP-St.-DVBz copolymer (100 – 200 mesh) | | | | 1.1 | 100 | 700 |
| 15 | 9 | 2-VP-MMA-DVBz copolymer (200 – 400 mesh) | | | | 1.2 | 100 | 850 |

(*1) The values of the ratio of enzyme and cells bonded were found by testing the supernatants of the respective reaction mixtures for protein concentration by Lowry process.

(*2) The enzyme activity was determined on the basis of Modified Takasaki process (Agricultural Biological Chemistry, Vol. 30, 1248 (1960)). Activity units were indicated by assuming the unity, 1 GIU, to represent production of 1 mg of fructose from 1 g of a given specimen under conditions of 70°C and 60 minutes.

EXAMPLES 16 – 19:

Preparation of immobilized compositions of various enzymes

Table 4 shows preferred embodiments of the immobilization of glucose oxidase, alkaline protease and invertase on various carriers produced in the indicated carrier production examples.

Table 4

| Ex. No. | Production Example No. (Carrier) | Carrier Composition of starting polymer | Amount used | Enzyme and cells Description | Manner of use | Conditions for immobilization | Yield of immobilized product (g) | Ratio of enzyme and cells bonded (%) (*1) | Enzyme activity units (GIU) |
|---|---|---|---|---|---|---|---|---|---|
| 16 | 5 | 2-VP-St.-DVBz copolymer (60 – 100 mesh) | (No. 1) | (No. 2) | (No. 3) | In each enzyme solution bufferized wet carrier was added and agitated at 4°C for 2 hours to permit reaction to ensue. After the reaction, the reaction mixture was centrifuged and the resultant sediment was washed several times with water and | 2.1 | 60 | 1000 (*2) |
| 17 | 4 | 2-VP-St.-DVBz copolymer (60 – 100 mesh) | (No. 4) | (No. 5) | (No. 6) | | 2.2 | 75 | 1700 (*3) |
| 18 | 6 | 4-VP-MMA-DVBz copolymer (100 – 200 mesh) | (No. 4) | (No. 5) | (No. 6) | | 2.5 | 100 | 3000 (*3) |
| 19 | 5 | 2-VP-St.-DVBz copolymer | (No. 7) | (No. 8) | (No. 9) | | 2.4 | 85 | 5000 (*4) |

Table 4-continued

| Ex. No. | Production Example No. (Carrier) | Carrier Composition of starting polymer | Enzyme and cells Amount used | Description | Manner of use | Conditions for immobilization | Yield of immobilized product (g) | Ratio of enzyme and cells bonded (%) (*1) | Enzyme activity units (GIU) |
|---|---|---|---|---|---|---|---|---|---|
| | | (60 – 100 mesh) | | | | lyophilized. | | | |

(No. 1): Carrier, 2 g, was bufferized with 0.1M acetate buffer (pH 5.5).
(No. 2): Glucose oxidase (made by Sigma Chemical Company, Type II, activity units = 18,900 u/g)
(No. 3): Enzyme, 1 g, was dissolved in 100 cc of 0.1M acetate buffer (pH 5.5).
(No. 4): Carrier, 2 g, was bufferized with 0.1M phosphate buffer (pH 8.0).
(No. 5): Alkaline protease (Commercial grade, activity units = 30000 u/g)
(No. 6): Enzyme, 1 g, was dissolved in 100 cc of 0.1M phosphate buffer (pH 8.0).
(No. 7): Carrier, 2 g, was bufferized with 0.1M acetate buffer (pH 5.0).
(No. 8): Invertase (made by Sigma Chemical Company, activity units = 100,000 u/g)
(No. 9): Enzyme, 1 g, was dissolved in 100 cc of 0.1M acetate buffer (pH 5.0).
(*1) The values of the ratio of enzyme and cells bonded were found similarly to Example by Lowry process.
(*2) This was determined on the basis of the titration method (Soc. Chem. Ind. (London), Monograph 11, 72 (1961)). Activity units were indicated by assuming the unity, 1 unit/g, to represent oxidation of 1.0$\mu$. mol of glucose into gluconic acid by 1 g of a given specimen at pH 5.1 at 35°C for one minute.
(*3) This was determined on the basis of Casein-Folin method (Standard Biochemical Experiment, Kobundo, 207 (1953)). Activity units were indicated by assuming the unity, 1 unit/g, to represent production, per 1 g of a given specimen, of such amount of nonproteinaceous substance as to exhibit an absorbance at 660 m$\mu$ equalling 1 $\gamma$ of tyrosine after standing at 30°C for one minute at pH 8.0.
(*4) This was determined on the basis of E. Fischer and L. Kohtes method (Helr. Chim. Acta., 34 1123 (1951)). Enzyme activity units were indicated by assuming the unity, 1 unit/g, to represent liberation of 1 mg of hexose from sucrose as a substrate after standing at 20°C for 3 minutes.

EXAMPLE 20:

Continuous production of L-methionine from N-acetyl-DL-methionine by use of immobilized aminoacylase composition A jacketed column measuring 10 mm in inside diameter and 300 mm in height and maintained at 50°C was packed with 1 g of the immobilized aminoacylase composition prepared in Example 1. N-acetyl-DL-methionine (0.2M, pH 7.0, 5 × $10^{-4}$ M. Co$^{++}$) was fed downflow through the column continuously at a flow rate of 5 cc/hour. The effluent which flowed out of the column bottom was analyzed by the ninhydrin colorimetric method to determine the yield of L-methionine. After 30 days of continuous reaction, the conversion of N-acetyl-L-methionine in the raw material, N-acetyl-DL-methionine, to L-methionine was found to be 100%.

EXAMPLE 21:

Continuous production of L-2-aminobutyric acid from N-acetyl-DL-2-aminobutyric acid by use of immobilized aminoacylase composition The same column as used in Example 20 was packed with 1 g of the immobilized aminoacylase composition prepared in Example 5. N-acetyl-DL-2-aminobutyric acid (0.2M, pH 7.0, 5 × $10^{-4}$ M. Co$^{++}$) was fed downflow through the column continuously at a flow rate of 5 cc/hour. The reaction temperature was 50°C. After 30 days of continuous reaction, the conversion of N-acetyl-L-2-aminobutyric acid to L-2-aminobutyric acid was found to be 100%.

EXAMPLE 22:

Continuous production of glucose from starch by use of immobilized glucoamylase composition A jacketed column measuing 15 mm in inside diameter and 300 mm in height and maintained at 40°C was packed with 2.0 g of the immobilized glucoamylase composition prepared in Example 8. Liquid starch, 30% (W/W) (pH 4.5, dextrose equivalent ≈ 20) was fed downflow through the column continuously at a flow rate of 5 cc/hour. The effluent which flowed out of the column bottom was analyzed by the DNS method to determine the yield of glucose. After 30 days of continuous reaction, the conversion of starch to glucose was found to exceed 95%. Paper chromatography conducted on the product revealed no sign of oligo-dextrose formation in the product.

EXAMPLE 23:

Continuous production of fructose from glucose by use of immobilized glucose isomerase composition A jacketed column measuring 26 mm in inside diameter and 300 mm in height and maintained at 60°C was packed with a homogeneous mixture of 1.0 g of the immobilized glucose isomerase composition prepared in Example 15 and 3.0 g of cellulose powder (200 – 400 mesh) incorporated as a diluent. A 30% (W/W) glucose solution (pH 8.0, 5 × $10^{-3}$ M MgSO$_4$·7H$_2$O) was fed downflow through the column continuously at a flow rate of 5 cc/hour. The effluent which flowed out of the column bottom was analyzed by the cystein-carbazol method to determine the yield of fructose. In the early stage of reaction, formation of fructose of an amount corresponding to about 50% of glucose was observed (isomerization ratio 50%). Even after 30 days of continuous reaction, the isomerization ratio was still higher than 47%.

EXAMPLE 24:

Continuous production of gluconic acid from glucose by use of immobilized glucose oxidase composition In a reactor having a volume of 1 liter, 2 g of the immobilized glucose oxidase composition prepared in Example 16 and 500 cc of 15% (W/W) glucose solution (pH 5.2) were introduced and agitated at 35°C by forcedly introducing therein clean air to permit reaction to ensue. The reaction mixture was constantly adjusted to pH 5.2 by suitable addition of NaOH. After 48 hours of reaction, the reaction mixture was tested for the unaltered glucose content. The analysis showed that 100% of glucose had reacted. Paper chromatography conducted on the product revealed that it was composed wholly of gluconic acid.

EXAMPLE 25:

Continuous production of glucose and fructose from sucrose by use of immobilized invertase composition A column measuring 10 mm in inside diameter and 300 mm in height was packed with 1 g of the immobilized invertase composition prepared in Example 19. At normal room temperature, a 10% (W/W) sucrose solution (pH 4.5) was fed downflow through the column continuously at a flow rate of 5 cc/hour. The effluent which flowed out of the column bottom was analyzed by the DNS method and the cystein carbazol method to determine the conversion of glucose. Even after one month of continuous reaction, the conversion of 100% was still maintained.

What is claimed is:

1. A water-insoluble, enzymatically active immobilized enzyme composition comprising a biologically active enzyme substance bonded to a substantially water-insoluble anion exchange resin having a quaternized nitrogen atom contained in a pyridine ring in the molecular unit thereof, said anion exchange resin being formed by allowing a reagent capable of quaternizing the nitrogen atom in said pyridine ring and selected from the group consisting of methyl chloride, methyl bromide, methyl iodide and dimethyl sulfate to react upon a copolymer which is obtained by copolymerizing a vinyl pyridine selected from the group consisting of 4-vinyl pyridine, 2-vinyl pyridine, 5-methyl-2-vinyl pyridine, 3-allyl pyridine, 1-vinyl quinoline and 2-methyl-5-vinyl pyridine and at least one monomer selected from the group consisting of aromatic vinyl compounds, ethylenically unsaturated compounds, diene-unsaturated compounds and divinyl-unsaturated compounds which are copolymerizable with said vinyl pyridine, said vinyl pyridine being present in an amount of from 20 to 99 mol %.

2. An immobilized enzyme composition according to claim 1, wherein the anion-exchange-resin has a total anion-exchange capacity of the order of 2.0 to 5.0 meq/g.

3. An immobilized enzyme composition according to claim 1, wherein the divinyl-unsaturated compounds include divinylbenzene and (poly)ethylene glycol dimethacrylate.

4. An immobilized enzyme composition according to claim 1, wherein the preparation of the copolymer is effected by radical polymerization.

5. An immobilized enzyme composition according to claim 1, wherein the preparation of the copolymer is effected by block or graft polymerization.

6. An immobilized enzyme composition according to claim 5, wherein vinylpyridine is present in an amount of from 25 to 75 mol%.

7. An immobilized enzyme composition according to claim 1, wherein the biologically active enzyme substance is selected from the group consisting of aminoacylase, glucoamylase, glucose isomerase, glucose oxidase, alkaline protease, invertase and microorganic cells containing said enzymes.

8. An immobilized enzyme composition according to claim 1 wherein said monomer is a divinyl-unsaturated compound in an amount of from 0.5 to 30 mol %.

9. A method for continuously converting a substrate by use of the water-insoluble, enzymatically active immobilized enzyme composition according to claim 1.

10. A method according to claim 9, wherein an immobilized aminoacylase composition is used to effect continuous conversion of N-acetyl-DL-amino acid into L-amino acid.

11. A method according to claim 9, wherein an immobilized glucoamylase composition is used to effect continuous conversion of starch into glucose.

12. A method according to claim 9, wherein an immobilized glucose isomerase composition is used to effect continuous conversion of glucose into fructose.

13. A method according to claim 9, wherein an immobilized glucose oxidase composition is used to effect continuous conversion of glucose into gluconic acid.

14. A method according to claim 9, wherein an immobilized invertase composition is used to effect continuous conversion of sucrose into glucose and fructose.

* * * * *